(12) United States Patent
Batten et al.

(10) Patent No.: US 6,419,289 B1
(45) Date of Patent: Jul. 16, 2002

(54) VEHICLE BUMPER SYSTEM

(75) Inventors: Laverne Jay Batten, Birch Run, MI (US); Jeff R. Zawacki, Channahon; Ray W. Atchinson, Naperville, both of IL (US)

(73) Assignees: The Boler Company, Itasca, IL (US); Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/860,378

(22) Filed: May 18, 2001

(51) Int. Cl.[7] ............................................... B60R 19/08
(52) U.S. Cl. ...................................... 293/117; 362/205
(58) Field of Search .......................... 293/117; 362/505, 362/287, 576, 382, 464, 226, 238, 240; 296/180.1; 439/35, 550

(56) References Cited

U.S. PATENT DOCUMENTS

| | | | | |
|---|---|---|---|---|
| 3,581,081 A | * | 5/1971 | Rieth | 362/382 |
| 3,639,748 A | * | 2/1972 | Pearson et al. | 293/117 |
| 3,692,992 A | * | 9/1972 | Bain et al. | 362/464 |
| 4,151,439 A | * | 4/1979 | Moss | 362/226 |
| 4,213,644 A | * | 7/1980 | Scrivo et al. | 293/117 |
| 4,387,920 A | * | 6/1983 | Slaughter et al. | 293/117 |
| 4,441,752 A | * | 4/1984 | Buehrig | 296/180.1 |
| 4,503,488 A | * | 3/1985 | Soules et al. | 362/238 |
| 4,525,005 A | * | 6/1985 | Prochaska et al. | 293/117 |
| 4,679,125 A | * | 7/1987 | Dick | 362/240 |
| 4,798,409 A | * | 1/1989 | Miller | 293/117 |
| 4,894,640 A | * | 1/1990 | Beasley et al. | 340/464 |
| 5,288,117 A | * | 2/1994 | Vogelgesang | 293/117 |
| 5,478,243 A | * | 12/1995 | Hopkins et al. | 439/35 |
| 5,833,283 A | * | 11/1998 | Shaw | 293/117 |
| 5,844,479 A | * | 12/1998 | Walton | 340/479 |
| 6,039,602 A | * | 3/2000 | Witkowski et al. | 439/550 |
| 6,100,801 A | * | 8/2000 | Plummer | 340/479 |
| 6,179,654 B1 | * | 1/2001 | Witkowski et al. | 439/550 |
| 6,282,969 B1 | * | 9/2001 | Daniel | 367/93 |
| 6,318,774 B1 | * | 11/2001 | Karr et al. | 293/117 |
| 6,340,187 B1 | * | 1/2002 | Villiere et al. | 293/117 |

* cited by examiner

*Primary Examiner*—K B Patel
(74) *Attorney, Agent, or Firm*—Cook, Alex, McFarron, Manzo, Cummings & Mehler, Ltd.

(57) ABSTRACT

A vehicle bumper system is shown to include a vehicle bumper component, a main electrical connector integrated with the vehicle bumper component, a second electrical connector integrated with the vehicle bumper component, and an electrical communication path integrated with the vehicle bumper component. The electrical communication path extends between the first electrical connector and the second electrical connector. The vehicle bumper component is designed to permit mounting of an electrically controlled device at a mounting area. The second electrical connector is at or in close proximity to the mounting area to permit the electrically controlled device to electrically couple therewith when it is mounted at the mounting area of said vehicle bumper component. Another electrical communication path electrically couples the second electrical connector with bumper mounting holes used to permit mounting of the bumper component with a vehicle chassis/frame.

38 Claims, 2 Drawing Sheets

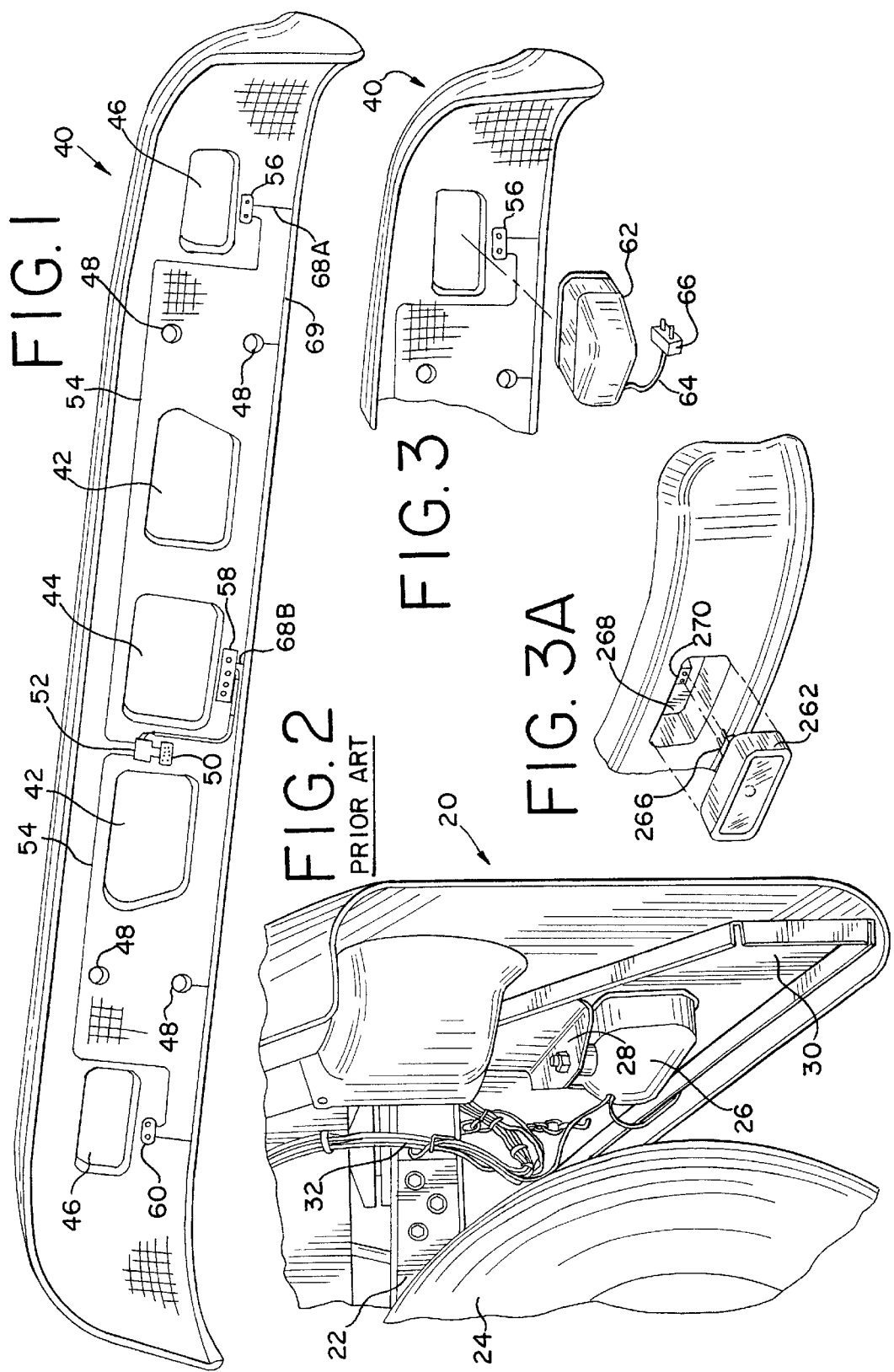

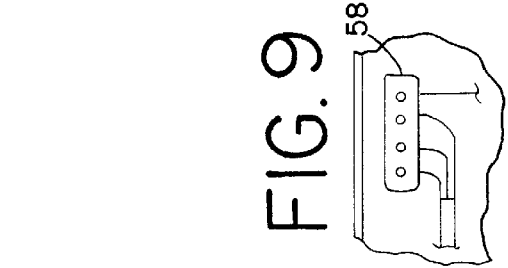
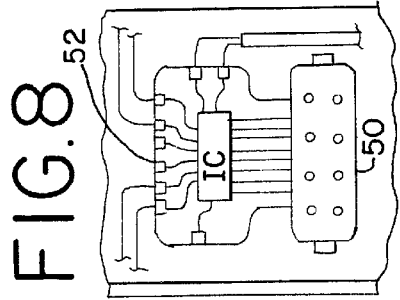
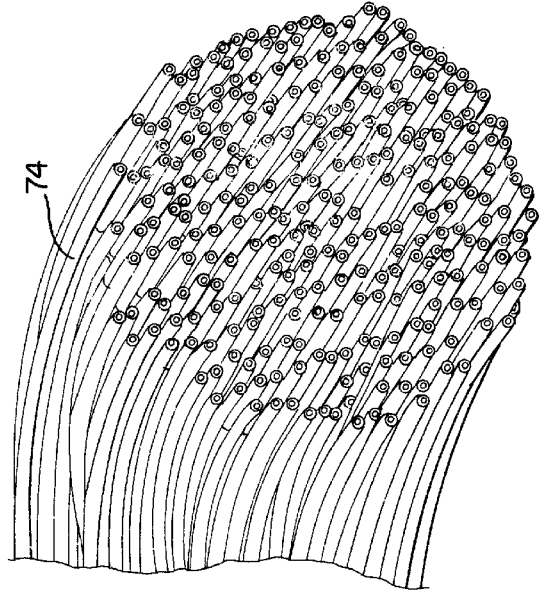
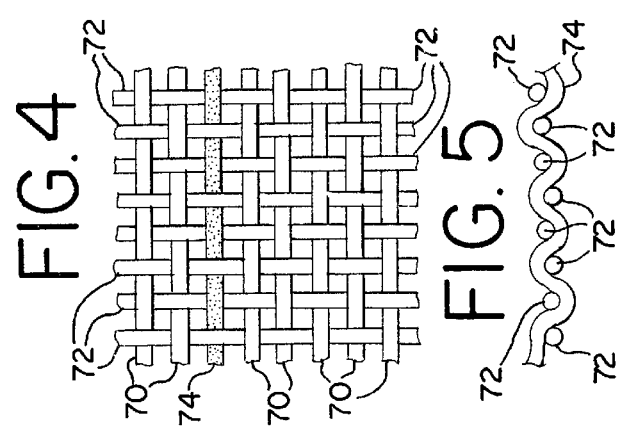
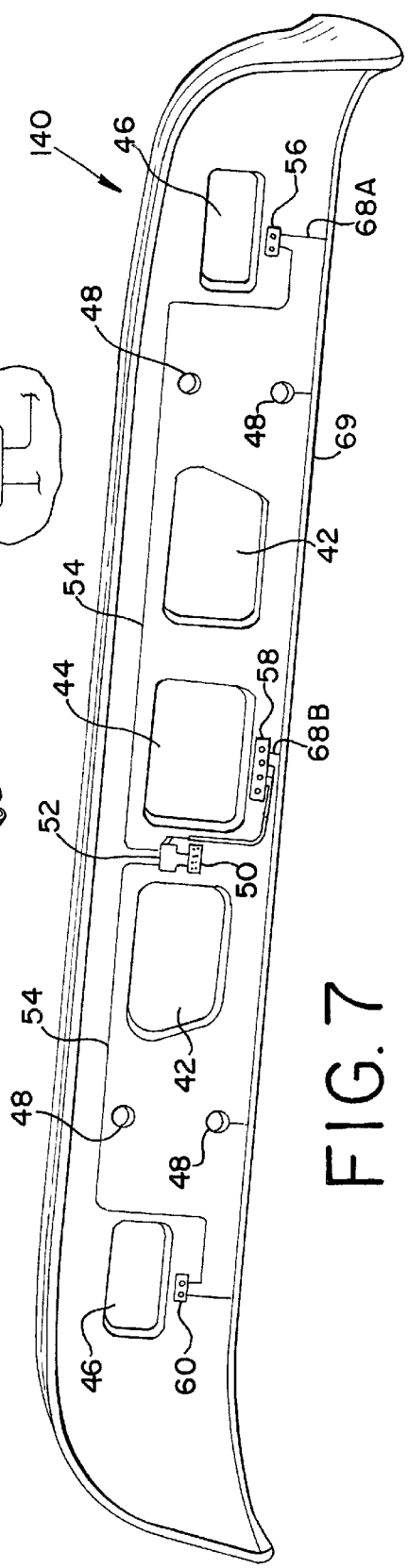

VEHICLE BUMPER SYSTEM

BACKGROUND OF THE INVENTION

The present invention relates generally to vehicle bumper systems and, more particularly to vehicle bumper systems having vehicle bumpers with integrated electrical conductors used to energize and communicate electrically with bumper-mounted devices. Still more particularly, the present invention relates to commercial vehicle bumper systems having a vehicle bumper with integrated electrical conductors used to energize and communicate electrically with bumper-mounted devices.

It is well known within the art that vehicle bumper systems include a variety of components. One primary component in vehicle bumper systems is the vehicle bumper itself. As known by those skilled in the art, bumpers can be single- or multi-piece components. Additionally, bumpers can consist of a back mounting plate with a cosmetic, aesthetically pleasing, visible front plate secured thereto.

Vehicle bumper systems further include mounting attachments, which permit devices to be mounted to the bumper. Examples of such attachments are brackets, bolts, hangers and the like.

Vehicle bumper systems also include electrically controlled devices that can be secured to the bumper or positioned in close proximity therewith. Examples of such devices include but are not limited to headlights and other lighting systems, lamps and indicators, antennae, various sensors, and sight sticks that function as corner locators.

In addition, vehicle bumper systems include wiring harnesses that electrically couple the forgoing devices to an electrical energy source and/or electronic control circuitry. When incorporated for use with a particular vehicle, all of the foregoing comprise a vehicle bumper system.

It is well known that bumper systems are incorporated in virtually every land vehicle, including trucks and automobiles. As such, bumper systems are incorporated in commercial vehicles, including those commercial vehicles classified in classes five through eight.

FIG. 2 illustrates a conventional bumper system 20 incorporated in a standard commercial vehicle having a chassis 22 and wheel 24. The conventional vehicle bumper system 20 shown in FIG. 2 includes a bumper-mounted device showing in the form of a headlight 26 mounted to a hanger 28 extending from the rear of the conventional vehicle bumper 30. The conventional vehicle bumper system 20 further includes a wiring harness 32 extending from chassis 22 to provide electrical energy to the circuitry incorporated within the housing of device 26.

As will be appreciated by those skilled in the art, in conventional vehicle bumper systems, at least one wiring harness is used for bumper-mounted electrically controlled devices, and at least one electrical conductor extends to each electrically controlled device, typically hanging loosely between the vehicle chassis and/or wiring harness and the electrically controlled device. Each wiring harness typically includes copper wiring, crimp connectors, wire ties, wire clamps and the like.

The use of wiring harnesses and other loosely hanging electrical conductors as components of a vehicle bumper system presents several potential problems. Their installation is particularly complex and laborious.

It will also be appreciated by those skilled in the art that the wiring harnesses and other loosely hanging electrical conductors tend to wear more rapidly when subjected to inclement weather and increased road debris.

They also wear during ordinary vehicle operation, as they are subjected to forces in a variety of directions to the point where they often ultimately come disconnected at their weakened connections, causing failure of the electrically controlled devices in the bumper system.

Another deficiency of conventional vehicle bumper systems is that redundant lamps must be used, even in the case of common-switched lighting and indicators. One wiring harness is typically required for each lamp.

Another deficiency of conventional vehicle bumper systems is that electrical shorts and open circuits can and do occur as wiring harnesses and other loosely hanging electrical conductors wear with extended vehicle operation.

Another deficiency of conventional vehicle bumper systems is that the wiring harnesses and loosely hanging electrical conductors extending to bumper-mounted devices mounted closest to the opposite ends of the bumper, such as is the case with headlights, are often subjected to the greatest forces during vehicle operation, and tend to wear faster than those extending to bumper-mounted devices mounted in a central portion of the bumper.

In light of the foregoing, it is desirable to develop a vehicle bumper system that has a reduced number of vehicle bumper system component parts.

It is further desirable to develop a vehicle bumper system that has reduced installation complexity.

It is further desirable to develop a vehicle bumper system that requires less labor in order to install the system on a particular vehicle, translating into less costs associated with the system.

It is further desirable to develop a vehicle bumper system that requires only a single wiring harness for electrically controlling a plurality of bumper-mounted electrically controlled devices.

It is further desirable to develop a vehicle bumper system that eliminates redundant lamps for common switch lighting and indicators.

It is further desirable to develop a vehicle bumper system that eliminates flex-induced fiber optic cable and electrical wire breakage, translating into increased useful life for the system.

It is further desirable to develop a vehicle bumper system that provides relatively simple self-wiring installation of bumper-mounted, electrically controlled devices, such as electrical and lighting components.

It is further desirable to develop a vehicle bumper system that provides design freedom for cosmetic lighting.

It is further desirable to develop a vehicle bumper system that accommodates an integrated circuit to reduce the number of electrical conductors required for operation of bumper-mounted, electrically controlled devices.

It is further desirable to develop a vehicle bumper system that has faster assembly time.

It is further desirable to develop a vehicle bumper system that has reduced components.

It is further desirable to develop a vehicle bumper system that has a single electrical connector associated with the bumper to which a single connector extending from the vehicle chassis is mated.

It is further desirable to develop a vehicle bumper system that reduces the possibility of connection failure.

It is further desirable to develop a vehicle bumper system that is adaptable to accommodate various bumper-mounted, electrically controlled devices without requiring modifications to the integrated electrical connections.

It is further desirable to develop a vehicle bumper system that provides for guaranteed grounding to the grounded vehicle frame through the bumper mounting features.

It is further desirable to develop a vehicle bumper system that reduces the potential for electrical short and open circuits.

These and other desired benefits of the preferred forms of the invention will become apparent from the following description. It will be understood, however, that a system or method could still appropriate the claimed invention without accomplishing each and every one of these desired benefits, including those gleaned from the following description. The appended claims, not these desired benefits, define the subject matter of the invention. Any and all benefits are derived from the preferred forms of the invention, not necessarily the invention in general.

BRIEF SUMMARY OF THE INVENTION

The present invention is directed to a vehicle bumper system. Preferably, the vehicle bumper system includes a vehicle bumper component. It further preferably includes a first electrical connector integrated with the vehicle bumper component. Still further, it preferably includes a second electrical connector integrated with the vehicle bumper component. Even further, it preferably includes an electrical communication path integrated with the vehicle bumper component. This electrical communication path preferably extends between the first electrical connector and the second electrical connector.

BRIEF DESCRIPTION OF THE SEVERAL VIEWS OF THE DRAWING

Throughout this description, reference has been and will be made to the accompanying views of the drawing wherein like subject matter has like reference numerals, and wherein:

FIG. 1 is a rear view of a fiber-reinforced composite vehicle bumper used in a vehicle bumper system constructed in accordance with the principles of the present invention;

FIG. 2 is a rear perspective view of a prior art vehicle bumper system installed on a commercial vehicle;

FIG. 3 is a fragmentary view of the fiber-reinforced composite bumper shown in FIG. 1 having a bumper-mounted, electrically controlled device shown in exploded form from its mounting position;

FIG. 3A is a fragmentary view of a different embodiment of the fiber-reinforced composite bumper shown in FIG. 1 having a bumper-mounted, electrically controlled device shown in exploded form from its mounting position; mounted electrically controlled device shown in exploded form from its mounting position;

FIG. 4 is a diagrammatic view of an exemplary weave formed during manufacture of fiber-reinforced composite bumpers constructed in accordance with the principles of the present invention, such as the one shown in FIG. 1;

FIG. 5 is an end view of the diagrammatic view shown in FIG. 4;

FIG. 6 is a fragmentary end view of a toe of fibers used in fiber-reinforced composite bumpers constructed in accordance with the principles of the present invention;

FIG. 7 is a rear view of a metal vehicle bumper used in a vehicle bumper system constructed in accordance with the principles of the present invention;

FIG. 8 is an enlarged fragmentary view of a portion of the vehicle bumpers shown in FIGS. 1 and 7;

FIG. 9 is an enlarged fragmentary view of another portion of the bumpers shown in FIGS. 1 and 7; and FIG. 10 is an enlarged fragmentary view of yet another portion of the bumpers shown in FIGS. 1 and 7.

DETAILED DESCRIPTION OF THE INVENTION

FIG. 1 illustrates a fiber-reinforced composite vehicle bumper 40 designed to be used in vehicle bumper systems constructed in accordance with the principles of the present invention. Fiber-reinforced composite vehicle bumper 40 is of a type known in the art. It will be appreciated, however, that the principles of the present invention are not limited to fiber-reinforced composite bumpers, but certain aspects of the present invention apply to vehicle bumpers generally.

Fiber-reinforced composite vehicle bumper 40 includes air ducts 42, central bumper-mounted device bore 44, and two end bumper-mounted bores 46. Further included for fiber-reinforced composite vehicle bumper 40 are bumper mounting bores 48 to permit the bumper to be mounted to a vehicle frame/chassis or the like.

Fiber-reinforced composite vehicle bumper 40 includes a main electrical connector 50 designed to receive and accommodate a connector coupled to a single wiring harness extending from the vehicle frame. Advantageously, this preferred.embodiment of the bumper forming a component of the preferred vehicle bumper system requires that only a single wiring harness be used for providing electrical energy and communication to bumper-mounted, electrically controlled devices. Further advantageously, main electrical connector 50 is positioned generally in close proximity to the vehicle centerline such that the single wiring harness extending from the vehicle chassis will be subjected to minimal vibration and other forces during vehicle operation. As such, the useful life of the vehicle bumper system will be maximized.

Main electrical connector 50 is electrically coupled to an integrated circuit 52 that is integrated with fiber-reinforced composite vehicle bumper 40 in order to facilitate switching control for the electrical circuitry integrated with the bumper. Integrated circuit 52 therefore reduces the number of electrical connections required, yet maintains the switching control required for communication with bumper-mounted, electrically controlled devices.

Main signal conductors 54 extend from integrated circuit 52 to electrical connectors 56, 5B, 60. As explained above, bumper-mounted, electrically controlled devices will typically be mounted to fiber-reinforced composite bumper 40 at central bumper-mounted device bore 44 and end bumper-mounted device bores 46. Electrical connector 56 positioned in close proximity to one of the end bumper-mounted device bores 46 is illustrated as a two-pin electrical connector. Referring briefly to FIG. 3, a bumper-mounted, electrically controlled device 62 is illustrated in the form of a headlight having an electrical lead 64 coupled to a two-pin electrical connector shown in the form of an electrical plug 66. While not shown, it will be appreciated by those skilled in the art that headlight 62 is mounted to fiber-reinforced composite vehicle bumper 40 by mounting attachments similar to attachment 28 shown in FIG. 2. When mounted accordingly, the pins associated with two-pin electrical plug 66 are inserted into and received by the two bores included within electrical connector 56.

FIG. 3A illustrates a different embodiment for fiber-reinforced composite bumper 40. A bumper-mounted, electrically controlled device 262 is illustrated in the form of a headlight having a two-pin electrical connector shown in the form of an electrical plug 266 integrally connected to the back of the housing thereof. Fiber-reinforced composite bumper 40 includes a cavity-like mounting portion 268 that includes a forward facing electrical connector 270 designed to receive plug 266. When mounted properly, the pins associated with two-pin electrical plug 266 are inserted into and received by the two bores included within electrical connector 270.

Referring back to FIG. 1, it is seen that one pin attachment for electrical connector 56 is coupled to one of the main signal conductors 54, while the other pin is electrically coupled to tap line 68A extending from a ground bus line 69. Through this electrical coupling, headlight 62 car be caused to operate, as desired.

As further shown in FIG. 1, electrical connector 58 is a four-pin electrical connector positioned in close proximity to central bumper-mounted device bore 44. As such, central bumper-mounting device bore 44 is able to permit mounting of a bumper-mounted device such as an antenna or other device requiring additional control circuitry. Electrical connector 58 has three of its bores electrically coupled to integrated circuit 52, while its fourth bore is electrically coupled to a tap line 68B for ground bus line 69.

Electrical connector 60 resembles electrical connector 56. In that regard, electrical connector 60 is positioned in close proximity to end bumper-mounted device bore 46 at the other end of fiber-reinforced composite vehicle bumper 40. As such, electrical connector 60 is suited to permit operation of a bumper-mounted, electrically controlled device such as headlight 62 shown in FIG. 3.

Regarding the grounding for circuitry integrated with fiber-reinforced composite vehicle bumper 40, ground bus line 69 is electrically connected to certain of the bumper mounting bores 48. In this arrangement, the ground bus line 69 is electrically connected to the vehicle chassis/frame when the vehicle bumper is installed on a vehicle. In an alternative arrangement, the main electrical connector 50 can include a pin that is electrically connected to ground bus line 69. Under such circumstances, a ground conductor will extend in the wiring harness and be electrically coupled to a pin for the electrical connector that is designed to mate with main electrical connector 50.

The electrical circuitry integrated in the fiber-reinforced composite vehicle bumper 40 illustrated in FIG. 1 is constructed by weaving a solid conductor or toe of conductive fibers into the fiber fabric of the bumper. The bumper can then be molded by conventional vehicle bumper manufacturing processes. As will be appreciated by those skilled in the art, fiber-reinforced composite bumpers and the methods of making same are well known in the art. However, methods of making the fiber-reinforced composite vehicle bumper with integrated electrical circuitry to communicate with bumper-mounted, electrically controlled devices as described above are unique. Such methods are described below in further detail.

FIGS. 4 and 5 illustrate a plurality of longitudinally extending toes of fiber 70 positioned relative to a plurality of laterally extending toes of fiber 72 in such a manner that they form a weave pattern. Each toe of fiber 70 preferably alternates its position relative to adjacent toes of fiber 72. In that regard, as shown, each toe of fiber 70 alternates from extending under one toe 72, over the next toe 72, back under the following toe 72, and so forth. Similarly, each toe of fiber 72 preferably alternates its position relative to adjacent toes of fiber 70.

FIGS. 4 and 5 illustrate a longitudinally extending toe of fiber designated 74 that forms a conductor of the electrical circuit integrated with the fiber-reinforced composite vehicle bumper 40 shown in FIG. 1. In that regard, conductor 74 is integrated directly into the vehicle bumper material, specifically its fiber material.

FIG. 6 illustrates an enlarged end view of conductor 74. As shown, conductor 74 is a toe of fibers constructed from a plurality of small fibers extending in a generally uniform direction. Preferably, each fiber is made of carbon and plated with a material exhibiting conductive properties. Examples of suitable conductive materials include gold, copper, aluminum, etc.

In order to manufacture the fiber-reinforced composite bumper 40 illustrated in FIG. 1, the following processes are preferably carried out. First, a lay up process is performed wherein the fibers are positioned and oriented into the preferred shape of the final product. During this process, any desired conductors can be introduced either in the woven fabric, or can be added by manually weaving same into the fabric at desired locations.

In a preferred manner, a woven fabric would have a predetermined number of conductors serving as bus conductors woven into it. These bus conductors would act as signal and/or ground busses. This fabric would be stamped to the general shape of the final product in that peripheral edges and bores would be cut away.

Conductors that connect from the bus conductors at one end to other bumper system components at their other end, as desired, could then be manually woven into the fabric. The connections at the bus conductors would need to be sufficient. At the opposite end of the manually woven conductors, electrical connectors, integrated circuits or other desired components would then be attached onto the fabric.

In view of the foregoing, a woven fabric assembly would be formed, which would serve as a flexible circuit board supporting all conductors, integrated circuits, electrical connectors, fiber optics, communication lines and other components for the circuitry integrated with the vehicle bumper. This woven fabric assembly is then used in the lay up process for manufacturing the vehicle bumper having integrated circuitry.

After the lay up process, a molding process is performed wherein the fibers are infused with a resin matrix in such a manner that all fibers are uniformly made wet. During this process, the fibers will be caused to maintain their intended position. Once the resin is cured, the part is removed with all of its integrated circuitry intact. This process can be carried out using any conventional molding process well known in the art.

Finally, a finishing process is performed, which will include the post-molding operations to achieve the final product. These post-molding operations include deflashing, polishing, cutting, drilling, piercing, sanding, grinding, painting, and coating. Those skilled in the art will recognize that these operations are performed to finish the manufacturing process for the final product.

FIG. 7 illustrates a metal vehicle bumper 140 for use in a vehicle bumper system constructed in accordance with the principles of the present invention. While bumper 40 in FIG. 1 is a fiber-reinforced composite bumper, bumper 140 in FIG. 7 is a metal bumper. In that regard, metal bumper 140 can be constructed from aluminum, an alloy thereof, steel, an alloy thereof, or any other metal or metal alloy known to be suitable by those skilled in the art.

The electrical circuit layout shown for metal bumper 140 in FIG. 7 is identical to that shown in fiber-reinforced composite vehicle bumper 40 of FIG. 1. In the case of the metal bumper 140 shown in FIG. 7, however, the circuitry does not form part of the metal bumper, but rather the conductors, the electrical connectors and the integrated circuit are integrated with the metal vehicle bumper by being secured thereto, preferably by an adhesive bonding or the like. With an adhesive bonding, the conductors, integrated circuits and electrical connectors are permanently affixed to the rear of the metal bumper 140. The adhesive bonding acts as a structural support for the circuit as it is affixed to the metal bumper, and the bonding serves-to protect the circuitry from the environment.

FIG. 8 illustrates a detailed view of the main electrical connector 50 and integrated circuit 52 shown in FIGS. 1 and 7 as being integrated with fiber-reinforced composite bumper 40 and metal bumper 140, respectively. As shown, main electrical connector 50 preferably is an eight pin electrical connector and conductors extend from each pin of the main electrical connector to integrated circuit 52, thereby electrically coupling them together.

As will be appreciated by those skilled in the art, the design and architecture of integrated circuit 52 can preferably be such that the electrical circuitry integrated with fiber-reinforced composite bumper 40 and metal bumper 140 can provide energy, communication and switching control for a variety of bumper-mounted, electrically controlled devices. Alternatively those skilled in the art will appreciate that the design and architecture of integrated circuit 52 can preferably be optimized for specific applications.

FIG. 9 illustrates the four pin electrical connector 58 positioned in close proximity to central bumper-mounted device bore 44. As shown, three pins for electrical connector 58 are preferably coupled to conductors which, in turn, are coupled to integrated circuit 52 (see FIGS. 1 and 7). Additionally, the fourth pin for electrical connector 58 is preferably coupled to a tap line coupled to the ground bus line 69 (see FIGS. 1 and 7).

FIG. 10 illustrates the two pin electrical connector 60 positioned in close proximity to end bumper-mounted device bore 46 positioned at one end of fiber-reinforced composite bumper 40 and metal bumper 140. It will be appreciated that electrical connector 60 is similar to electrical connector 56 positioned in close proximity to the end bumper-mounted device bore 46 positioned on the opposite end of fiber-reinforced composite bumper 40 and metal bumper 140. One of the two pins for electrical connector 60 is preferably coupled to a conductor which, in turn, is coupled to integrated circuit 52 (see FIGS. 1 and 7). The other pin for electrical connector 60 is preferably coupled to a tap line coupled to the ground bus line 69 (see FIGS. 1 and 7).

While this invention has been described with reference to certain illustrative aspects, it will be understood that this description shall not be construed in a limiting sense. Rather, various changes and modifications can be made to the illustrative embodiments without departing from the true spirit and scope of the invention, as defined by the following claims. Furthermore, it will be appreciated that any such changes and modifications will be recognized by those skilled in the art as an equivalent to one or more elements of the following claims, and shall be covered by such claims to the fullest extent permitted by law.

What is claimed is:

1. A vehicle bumper system, comprising:
a vehicle bumper component;
a first electrical connector integrated with said vehicle bumper component;
a second electrical connector integrated with said vehicle bumper component; and
an electrical communication path integrated with said vehicle bumper component extending between said first electrical connector and said second electrical connector.

2. The vehicle bumper system of claim 1 wherein said vehicle bumper component is designed to permit mounting of an electrically controlled device at a mounting area of said vehicle bumper component, said second electrical connector is at or in close proximity to said mounting area of said vehicle bumper component, and said second electrical connector is designed to permit said electrically controlled device to electrically couple therewith when said electrically controlled device is mounted at the mounting area of said vehicle bumper component.

3. The vehicle bumper system of claim 1 wherein said vehicle bumper component comprises a fiber-reinforced composite bumper.

4. The vehicle bumper system of claim 3 wherein said electrical communication path is integrated with said vehicle bumper component by being woven into material forming said fiber-reinforced composite bumper.

5. The vehicle bumper system of claim 1 wherein said vehicle bumper component comprises a metal bumper.

6. The vehicle bumper system of claim 5 wherein said vehicle bumper component comprises an aluminum bumper.

7. The vehicle bumper system of claim 1 wherein said vehicle bumper component comprises a metal alloy.

8. The vehicle bumper system of claim 7 wherein said vehicle bumper component comprises a steel bumper.

9. The vehicle bumper system of claim 7 wherein said vehicle bumper component comprises a steel alloy bumper.

10. The vehicle bumper system of claim 7 wherein said vehicle bumper component comprises an aluminum alloy bumper.

11. The vehicle bumper system of claim 1 wherein said vehicle bumper component is made from a material selected from the group consisting of fibers, metals, and metal alloys.

12. The vehicle bumper system of claim 5 wherein said electrical communication path is integrated with said vehicle bumper component by being secured to said metal bumper.

13. The vehicle bumper system of claim 7 wherein said electrical communication path is integrated with said vehicle bumper component by being secured to said metal alloy bumper.

14. The vehicle bumper system of claim 1 further comprising an integrated circuit positioned along said electrical communication path intermediate said first electrical connector and said second electrical connector.

15. The vehicle bumper system of claim 1 wherein said electrical communication path comprises a fiber optic path.

16. A vehicle having a vehicle bumper system, comprising:
a vehicle chassis;
a vehicle bumper component mounted to said vehicle chassis;
a bumper-mounted electrically controlled device attached to said vehicle bumper component at a device mounting area of said vehicle bumper component;
a first electrical connector integrated with said vehicle bumper component;
a second electrical connector integrated with said vehicle bumper component and positioned at or in close proximity to said device mounting area;
exactly one wiring harness extending from said vehicle chassis to said vehicle bumper component having a wiring harness connector that is attached to said first electrical connector; and an electrical communication path integrated with said vehicle bumper component extending between said first electrical connector and said second electrical connector.

17. The vehicle of claim 16 wherein said vehicle bumper component comprises a fiber-reinforced composite bumper.

18. The vehicle claim 17 wherein said electrical communication path is integrated with said vehicle bumper component by being woven into material forming said fiber-reinforced composite bumper.

19. The vehicle of claim 16 wherein said vehicle bumper component comprises a metal bumper.

20. The vehicle of claim 19 wherein said vehicle bumper component comprises an aluminum bumper.

21. The vehicle of claim 16 wherein said vehicle bumper component comprises a metal alloy.

22. The vehicle of claim 21 wherein said vehicle bumper component comprises a steel bumper.

23. The vehicle of claim 21 wherein said vehicle bumper component comprises a steel alloy bumper.

24. The vehicle of claim 21 wherein said vehicle bumper component comprises an aluminum alloy bumper.

25. The vehicle of claim 16 wherein said vehicle bumper component is made from a material selected from the group consisting of fibers, metals, and metal alloys.

26. The vehicle of claim 19 wherein said electrical communication path is integrated with said vehicle bumper component by being secured to said metal bumper.

27. The vehicle of claim 21 wherein said electrical communication path is integrated with said vehicle bumper component by being secured to said metal alloy bumper.

28. The vehicle of claim 16 further comprising an integrated circuit positioned along said electrical communication path intermediate said first electrical connector and said second electrical connector.

29. The vehicle of claim 16 wherein said electrical communication path comprises a fiber optic path.

30. A vehicle bumper system, comprising:
a fiber-reinforced composite vehicle bumper component having a bumper mounting hole;
a first electrical connector integrated with said vehicle bumper component;
a second electrical connector integrated with said vehicle bumper component;
a first electrical communication path integrated with said vehicle bumper component extending between said first electrical connector and said second electrical connector; and
a second electrical communication path integrated with said vehicle bumper component and extending between said bumper mounting hole and said second electrical connector.

31. The vehicle bumper system of claim 30 wherein said first electrical communication path is integrated with said fiber-reinforced composite vehicle bumper component by being woven into material forming said fiber-reinforced composite vehicle bumper component.

32. The vehicle bumper system of claim 30 wherein said second electrical communication path is integrated with said fiber-reinforced composite vehicle bumper component by being woven into material forming said fiber-reinforced composite vehicle bumper component.

33. A vehicle bumper system, comprising:
a metal vehicle bumper component having a bumper mounting hole;
a first electrical connector integrated with said vehicle bumper component;
a second electrical connector integrated with said vehicle bumper component;
a first electrical communication path integrated with said vehicle bumper component extending between said first electrical connector and said second electrical connector; and
a second electrical communication path integrated with said vehicle bumper component and extending between said bumper mounting hole and said second electrical connector.

34. The vehicle bumper system of claim 33 wherein said first electrical communication path is integrated with said metal vehicle bumper component by being secured to said metal vehicle bumper component.

35. The vehicle bumper system of claim 34 wherein said first electrical communication path is secured to said metal vehicle bumper component by being adhesively bonded to said metal vehicle bumper component.

36. The vehicle bumper system of claim 33 wherein said second electrical communication path is integrated with said metal vehicle bumper component by being secured to said metal vehicle bumper component.

37. The vehicle bumper system of claim 36 wherein said second electrical communication path is secured to said metal vehicle bumper component by being adhesively bonded to said metal vehicle bumper component.

38. A method of making a fiber-reinforced composite bumper having integrated electrical circuitry, comprising the steps of:
forming a woven fabric of fibers with a pre-woven conductor woven into it;
stamping the woven fabric to a desired shape and configuration;
manually weaving a conductor into said fabric, as desired, in such a manner that said woven conductor is in electrical communication with said pre-woven conductor;
attaching an electrical component to said manually woven conductor;
molding said fabric by infusing said fibers with a resin;
curing the resin; and
performing any finishing process, as desired.

* * * * *